US008055364B2

(12) United States Patent  
Champion

(10) Patent No.: US 8,055,364 B2
(45) Date of Patent: *Nov. 8, 2011

(54) SYSTEM AND METHOD FOR REQUEST, DELIVERY AND USE OF MULTIMEDIA FILES FOR AUDIOVISUAL ENTERTAINMENT

(75) Inventor: Mark Champion, Kenmore, WA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 272 days.

This patent is subject to a terminal disclaimer.

(21) Appl. No.: 12/371,789

(22) Filed: Feb. 16, 2009

(65) Prior Publication Data

US 2009/0157207 A1   Jun. 18, 2009

Related U.S. Application Data

(63) Continuation of application No. 10/884,694, filed on Jul. 2, 2004, now Pat. No. 7,509,181.

(51) Int. Cl.
*G06F 17/00* (2006.01)
(52) U.S. Cl. .......................................... 700/94; 381/77
(58) Field of Classification Search .................. 700/94; 348/734; 381/77, 80, 81
See application file for complete search history.

(56) References Cited

U.S. PATENT DOCUMENTS

| 5,297,211 | A | 3/1994 | Noro |
| 6,026,150 | A | 2/2000 | Frank et al. |
| 6,127,941 | A | 10/2000 | Van Ryzin |
| 6,192,340 | B1 | 2/2001 | Abecassis |
| 6,255,961 | B1 | 7/2001 | Van Ryzin et al. |
| 6,778,869 | B2* | 8/2004 | Champion ................... 700/94 |
| 7,509,181 | B2* | 3/2009 | Champion ................... 700/94 |
| 2002/0013784 | A1 | 1/2002 | Swanson |
| 2002/0040255 | A1 | 4/2002 | Neoh |
| 2002/0072816 | A1 | 6/2002 | Shdema et al. |

* cited by examiner

*Primary Examiner* — Stella Woo
(74) *Attorney, Agent, or Firm* — Rader, Fishman & Grauer PLLC

(57) ABSTRACT

A personal computer connected to the Internet can receive and store audio and audiovisual data or programming from the Internet. This audio and audiovisual programming can be provided by the computer over a digital connection to speakers and/or a monitor located away from the computer at a location convenient for a user. A remote control unit allows the user to send signals back over the digital connection to the computer to control the computer to provide the audio or audiovisual programming that the user desires over the digital connection to the speakers and/or monitor located where the user is. The computer may send a listing of the available programming to the remote control unit from which the user can make selections.

23 Claims, 9 Drawing Sheets

SYSTEM AND METHOD FOR REQUEST, DELIVERY AND USE OF MULTIMEDIA FILES FOR AUDIOVISUAL ENTERTAINMENT

RELATED APPLICATIONS

The present application is a continuation of, and claims priority from, U.S. patent application Ser. No. 10/884,694, filed Jul. 2, 2004, which is incorporated herein in its entirety.

BACKGROUND OF THE INVENTION

Today, many types of audio and video entertainment are available through a personal computer (PC). For example, many personal computers now include a compact disc (CD) drive. The CD drive can be used to load programming from a CD to the computer, but can also be used to play audio CD's through the computer's audio system or to access multimedia programming on a CD-ROM. Similarly, some personal computers now include a digital video disc (DVD) player so that movies recorded on a DVD can be watched on the computer.

Additionally, if the computer is connected to the Internet, a wealth of audiovisual material for both entertainment and education can be downloaded and experienced using the computer. For example, some radio stations "broadcast" over the Internet by allowing listeners to access an audio data stream from the radio station's web-site which is received and played by that listener's computer. Files of audio data, particularly in the MP3 format, can be downloaded from the Internet, stored on a personal computer and then played by the computer whenever desired by the user.

The term "MP3" is short for Motion Picture Expert Group (MPEG) Layer 3 and is an audio compression standard that allows high quality audio to be stored in a reasonably small data file. The compression ratios limit the audio quality, but with MP3, a 128 Kilobits/second data stream will deliver near CD quality audio in stereo.

In addition to these sources of audio data, the Internet can also provide streaming audiovisual data such as music videos, news reports, etc. As the bandwidth of the Internet continues to evolve, more audiovisual programming will likely be available over the Internet.

While there is such a great wealth of audiovisual content available from the Internet, accessing this material typically requires the user to use and be located at his or her personal computer. This may be both uncomfortable and inconvenient. For example, a user may want to be in another room or part of the house in order to perform a task while listening to music that is resident on his or her computer or being received by the computer over the Internet. However, the user will have to stay near the computer to hear the audio being played.

Similarly, the user may wish to recline on a sofa or comfortable chair while watching an audiovisual program that has been downloaded from the Internet to the user's computer or is streaming from the Internet over a connection to the user's computer. However, unlike television sets, computers are not typically arranged in front of a sofa or the like. Rather, a computer is typically set-up on a desk or table with an appropriate chair that accommodates use of the computer's mouse and keyboard, but is not intended for relaxing while enjoying an audiovisual entertainment program.

Consequently, there is a need in the art for a method and system that allow a user to receive audio or audiovisual programming from the Internet with a personal computer, but which also allows the user to access and enjoy the received programming throughout the user's house at a location that is most convenient and comfortable for the user to do so.

SUMMARY OF THE INVENTION

The present invention meets the above-described needs and others. For example, the present invention provides a system and method for accessing and managing the audio and audiovisual programming on, or available to, a computer or other programming source so that the audio or audiovisual programming can be enjoyed in a place convenient to the user remote from the computer. Preferably, the user is also able, without the user being required to return to the computer, to control the audio or audiovisual programming being used.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a system for managing audio and audiovisual programming, the system including: an audio server for outputting an audio signal; at least one speaker; and a digital connection between the at least one speaker and the audio server over which the audio server provides the audio signal in digital form to the speaker.

In one example, the audio server is a computer on which audio or audiovisual data is stored or which is receiving a stream of audio or audiovisual data. However, the term "audio server" (190) is used herein to indicate any audio signal source or combination of signal sources that are used to output an audio signal to the speakers (103).

A transceiver may be disposed with the speaker for communicating with a remote control unit. The remote control unit controls the output of the audio signal from the audio server to the speaker by communicating with the audio server over the digital connection between the speaker and the audio server. Preferably, the audio server transmits a listing of available audio programming to the remote control unit via the connection and the transceiver. In this embodiment, the remote control unit has a display device for displaying the listing; and a user input device with which the user can select an audio program from the list and transmit a command for the audio server to output that selected audio program to the speaker.

The audio signal from the audio server may be compressed. Consequently, the speaker has decompression hardware for decompressing the signal.

In one embodiment, the connection between the audio server and the speaker is electrical wiring which also supplies power for the audio server and the speaker. In this case, the audio server and the speaker each have a power-line modem connected thereto for communicating via the electrical wiring.

In another embodiment, there are a number of speakers, at least some of which have a transceiver for communicating with a remote control unit. One or more remote control units can then be used to control the speakers such that a number of different audio signals are output by the audio server to respective speakers that are communicating with different remote control units.

In still another embodiment, the speaker is incorporated in a video monitor and the audio server is incorporated in an audiovisual server that outputs an audiovisual signal to the monitor. The audiovisual signal includes the audio signal for the speaker. In one embodiment, the audiovisual server is a computer The audiovisual server may transmit a listing of available audiovisual programming to a remote control unit via the digital connection to the monitor. The remote control unit communicates wirelessly with a transceiver of the monitor. In such a case the remote control unit has a display device for displaying the listing; and a user input device with which the user can select an audiovisual program from the list and transmit a command for the audiovisual server to output that selected audiovisual program to the monitor.

The present invention also encompasses the methods of making and using the system described above. More specifically, the present invention encompasses a method of managing audio and audiovisual programming by transmitting an audio signal from an audio server to at least one speaker over a digital connection between the speaker and the audio speaker, the transmitting of the audio signal being a digital transmission.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION

The present specification describes a method and system whereby a personal computer (PC) or other audio signal source is used as a server to provide audio or audiovisual data to electronic devices strategically located throughout a user's home so as to provide the user with the most convenient and flexible access possible to the audio and audiovisual data. A remote control unit allows the user to selectively access and control the programming available from the audio server without needing to return to the audio server.

Figure 1:
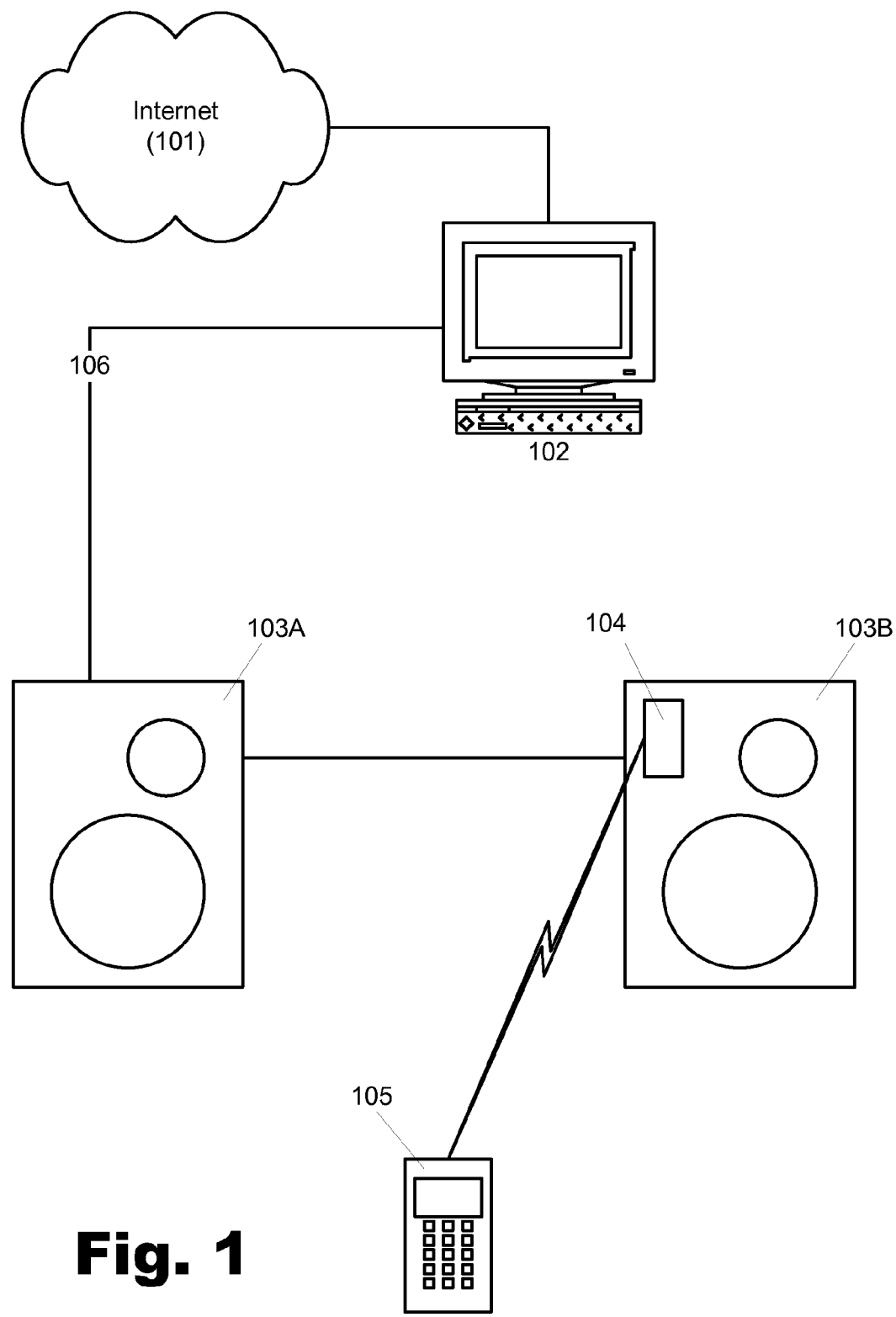
FIG. 1 is a diagram of a system for using streaming audio and audio files according to a first embodiment of the present invention.

Using the drawings, various embodiments of the principles described herein will now be explained. As shown in FIG. 1, an exemplary system includes a computer (102) which is connected to the Internet (101). With this connection, the computer (102) can download audio and audiovisual data files from the wealth of such data available on the Internet. (101). Additionally, the computer (102) can access streams of audio or audiovisual data that are transmitted over the Internet (101). The computer (102) will also preferably include a CD-ROM drive, a floppy disc drive, a zip disc drive and/or other means of data input through which audio or audiovisual data files can be transferred to the computer (102).

The computer (102) has a digital connection (106) to a number of speakers (103). These speakers (103) can be located away from the computer in a room or area where the user typically desires to listen to audio programming. For example, the speakers (103) may be in a workroom, kitchen, exercise room, etc. The speakers (103) may also be paired to provide a left speaker (103A) and right speaker (103B) for stereo sound.

The digital connection (106) may be any of a number of different types of connections. According to the present invention, the connection (106) is able to provide audio data to the speakers (103) at a sufficient rate that the speakers can output high quality audio based on the audio data received from the computer (102).

In some examples, the digital connection (106) may be a universal serial bus (USB). The USB operates according to an open standard for delivering digital data at rates up to 12 Megabits/second. With a USB, a single computer (102) can communicate with up to 127 devices. A USB connection is common in all computers sold after June 1998.

Alternatively, the digital connection (106) may be an IEEE 1394 connection, also known as a firewire connection. The IEEE1394 is a standard for delivering digital data at rates up to 100 Megabits/second. IEEE1394 connections are expected to become common in high performance computers in the near future. Consequently, an IEEE1394 connection will likely become easy to implement and provide much greater bandwidth than the currently popular USB connection.

In still another alternative, the digital connection (106) may be an Ethernet connection. Ethernet is a digital-networking scheme that is commonly used to network computers and other digital devices in Local Area Networks (LANs). Ethernet data transmission rates range up to 1 Gigabit/sec.

The digital connection (106) may also be other types of connections such as a wireless radio-frequency network or a phone line network. Any connection capable of carrying digital audio and/or audiovisual signals at the rates required for output to the speakers (103) or other output devices may be used as the digital connection (106).

Figure 2:
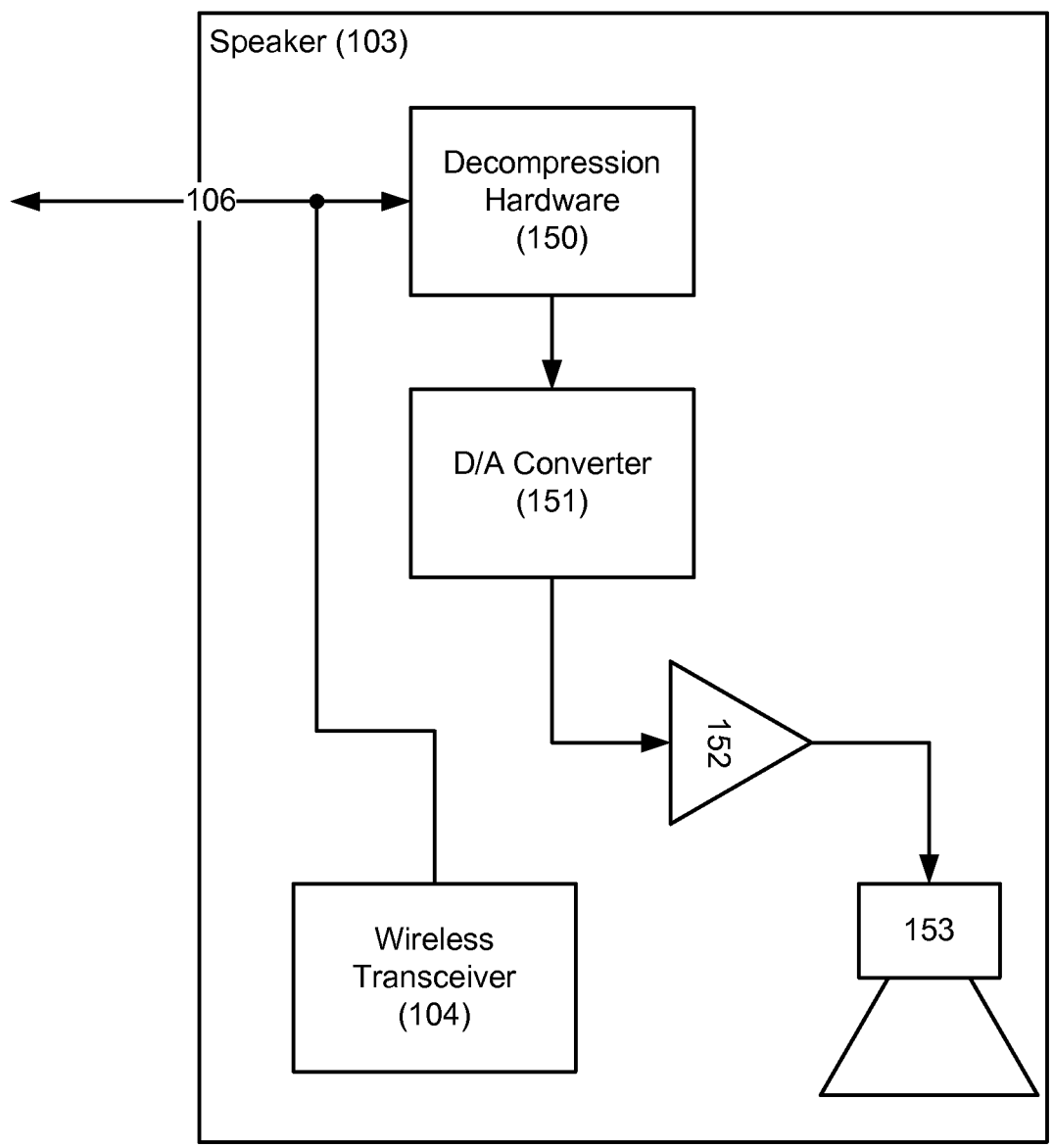
FIG. 2 is a diagram of a speaker unit according to the present invention as illustrated in FIG. 1.

As shown in FIG. 2, each speaker (103) has a digital-to-analog converter (151) to convert the digital audio signal from the digital connection (106) to an analog audio signal that can be output by the speaker (103). The analog signal is then amplified by an amplifier (152) and output by a speaker system (153). As will be understood by those skilled in the art, the speaker system (153) may actually include a number of speakers for reproducing different ranges of the audio signal. For example, the speaker system (153) may include a tweeter, a mid-range, a woofer, a sub-woofer, etc.

The computer (102) may send an audio signal to the speakers (103) that is or is not compressed. If the audio signal is compressed, each speaker (103) will preferably include decompression hardware (150) between the input from the digital connection (106) and the digital-to-analog converter (151). The decompression hardware (150) will correspond to the type of compression used by the computer (102) to receive and send the audio signal. For example, if the computer (102)

is outputting the contents of an MP3 audio file to the speakers (103), the decompression hardware (150) will comprise an MP3 decoder.

Returning to FIG. 1, the system illustrated includes a remote control unit (105) which communicates wirelessly with a wireless transceiver (104) which is located in each speaker or pair of speakers (103). In the illustrated example, the remote control unit (105) communicates using infrared (IR) signaling. Consequently, the transceiver (104) is an optical signal transceiver operating in the infrared range. However, the remote control unit (105) can use any other method of wirelessly communicating with the transceiver (104). For example, the transceiver (104) (and the counterpart transceiver in the remote control unit (105) (not shown)) may be a radio frequency transceiver.

In the audio system illustrated in FIG. 1, the remote control unit (105) can be used to control the audio programming output by the computer (102) to the speakers (103). In this way, the speakers (103) can be located wherever the user wishes to listen to the audio programming from the computer (102), and the user can control that programming without needing to return to the computer (102) to do so.

An exemplary method of using the remote control unit (105) will now be explained. Referring to FIG. 1, the computer (102) will transmit a listing of, for example, the audio files available and/or the digital audio streams from the Internet (101) that the computer (102) has been programmed to access. This listing is sent over the digital connection (106) to the speakers (103). The wireless transceiver (104) in the speaker or speaker pair (103), transmits the listing wirelessly to the remote control unit (105).

Figure 3:
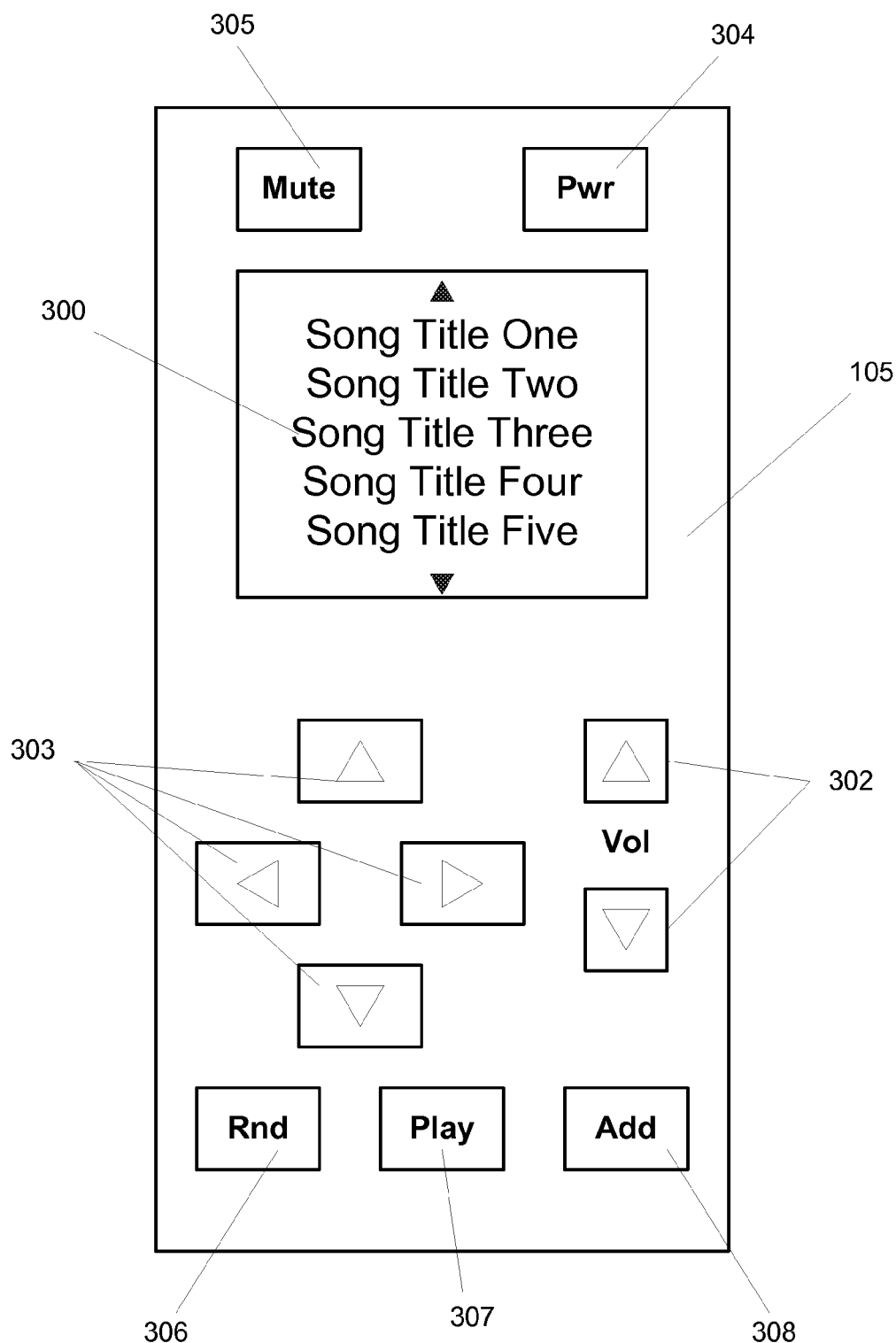
FIG. 3 is an illustration of a remote control unit used as part of the system illustrated in FIG. 1.

A more detailed view of the remote control unit (105) is illustrated in FIG. 3. As shown in FIG. 3, the remote control unit (105) preferably includes a display device (300), such as a liquid crystal display (LCD), on which information received from the computer (102) can be displayed. As illustrated in FIG. 3, the display (300) may be used to display, for example, a listing of available audio files, e.g. song titles, that can be retrieved by the computer (102) and output through the speakers (103). Alternatively, the display (300) may be used to display, for example, a listing of on-line radio stations or other streaming audio sources from which the computer (102) can receive streaming audio over the Internet (101).

Preferably, the remote control unit (105) includes a means to allow the user to move through the listing of available audio files or streaming audio sources and select files to be retrieved or an audio stream to be accessed and output through the speakers (103). This device may include a rotating shuttle, a trackball, a track pad, a joystick, etc. In the remote control unit (105) of FIG. 3, a group of four buttons (303) is preferably provided for moving a cursor or highlight bar over the display (300). In the listing shown in FIG. 3, for example, the up and down buttons of the button group (303) could be used to move a cursor or highlight up and down through the listing of audio files on the display (300). When a desired audio file or audio data stream is indicated by the cursor, the user can preferably press a "play" key (307) to have that audio file or audio stream sent to the speakers (103) by the computer (102).

Additionally, the user may want to create a listing of several audio files to be retrieved and output in a specified order, i.e. a play-list. Accordingly, the user can create such a play-list with the system of the present invention by using the four buttons (303), or an equivalent device, to indicate an audio file from the listing on the display (300) and pressing the "add" key (308) to add that file to the play-list. When the user has successively added all the desired files to the list, the user can press the "play" key to play the list. The audio files are preferably retrieved and output in the same order they were designated in the play-list. Alternatively, the computer (102) may be instructed to output audio files in a random order by actuation of the "random" key (306) on the remote control (105). Once the play-list is playing, the user may use, for example, the left and right buttons of the button group (303) to skip through or repeat songs from the play-list.

Preferably, the remote control unit (105) also includes a volume control (302) for the speakers (103), a "mute" button (305) for muting the sound from the speakers (103), and a "power" button (304) for turning power to the speakers (103) on and off. The control unit (105) may include other buttons not shown for providing various commands to the speakers (103) or to the computer (102) via the digital connection (106).

Figure 4:
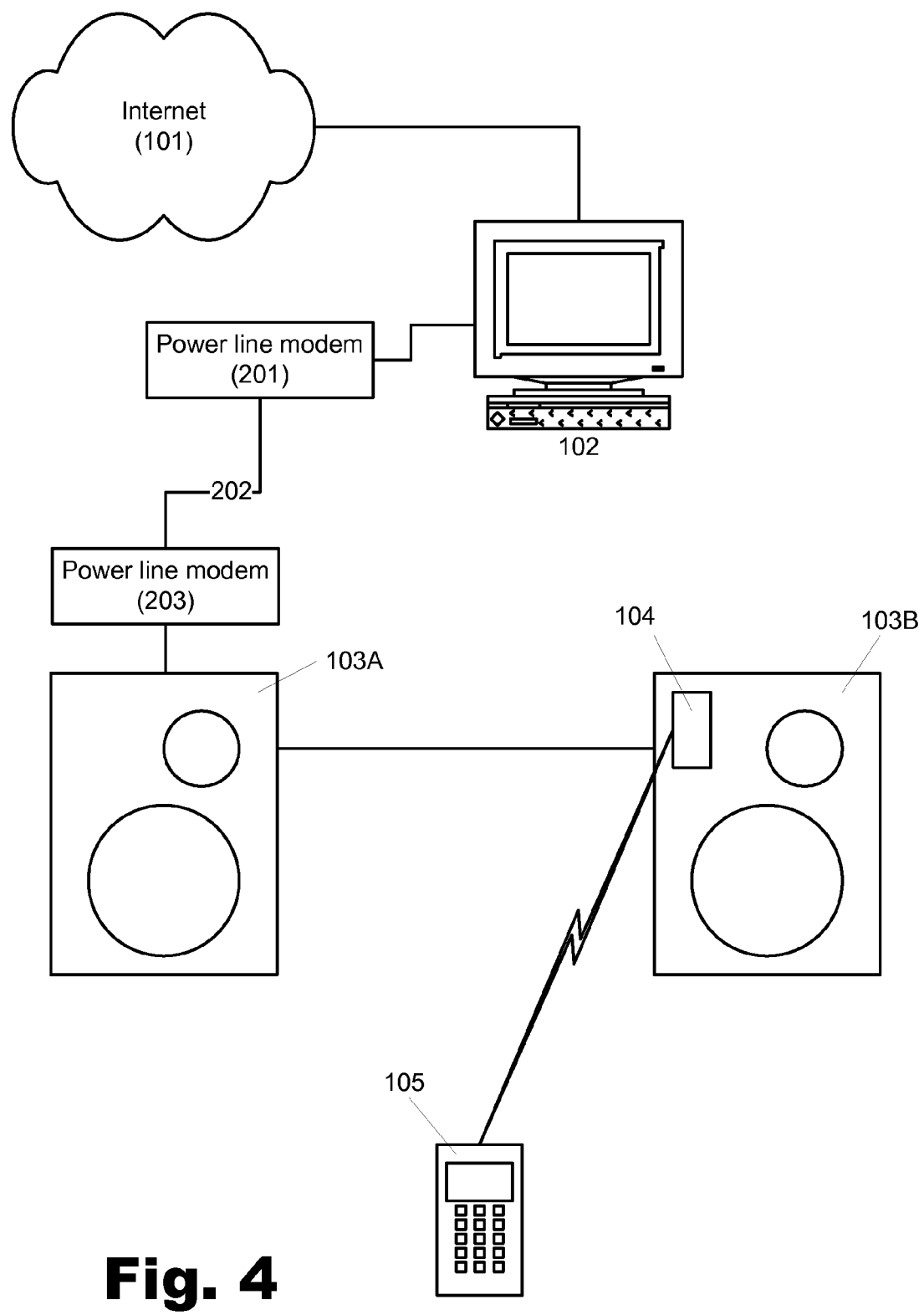
FIG. 4 is a diagram of a system for using streaming audio and audio files according to a second embodiment of the present invention.

FIG. 4 illustrates a second embodiment of the present invention which is similar to the first embodiment described above with reference to FIGS. 1-3. In the Figures, identical elements are given identical reference numbers. Consequently, a redundant exposition will be omitted of those features of the second embodiment of FIG. 4 which are identical to corresponding features of the first embodiment of FIG. 1.

The second embodiment of FIG. 4 uses a different digital connection between the computer (102) and the speakers (103) than the range of possible digital connections described above in connection with FIG. 1. As shown in FIG. 4, the computer outputs the digital audio signal to a power-line modem or power-line network interface (201). This modem (201) is plugged into a power outlet of the user's home and is, thus, connected to the electrical wiring (202) of the user's home. The power-line modem (201) may be internal to the computer (102) and may be connected to the electrical wiring (202) through the same cord that supplies power from the home's electrical wiring (202) to the computer (102).

The power-line modem (201) encodes the digital audio signal into a form that can be and is transmitted over the electrical wiring (202) of the home. The speaker or speaker pair (103) will also be plugged into the electrical wiring (202) of the home. Consequently, a second power-line modem (203) located with the speakers (103) receives the digital audio signal transmitted over the power-line (202) by the computer (102) and decodes or demodulates the audio signal. The audio signal is then output to the speakers (103) and is transduced into audible sound by the speakers (103) in the same manner described above.

The remote control unit (105), using the wireless transceiver (104), can also receive data from and transmit commands to the computer (102) over the electrical wiring (202). The second power-line modem (203) encodes or modulates the signals from the remote control unit (105) and transmits those signals to the first power-line modem (201) via the electrical wiring (202). The modem (201) then decodes the signals and outputs them to the computer (102). In like manner, the computer (102) can transmit a data signal to the remote control unit (105) via the power-line (202) and the power-line modems (201, 203).

With the embodiment of FIG. 4, the user can easily deploy the speakers (103) in any location served by the same electrical wiring (202) that powers the computer (102). The speakers (103) and the remote control unit (105) are then brought into communication with the computer (102) without the need for any additional dedicated wiring to be installed in the home.

Figure 5:
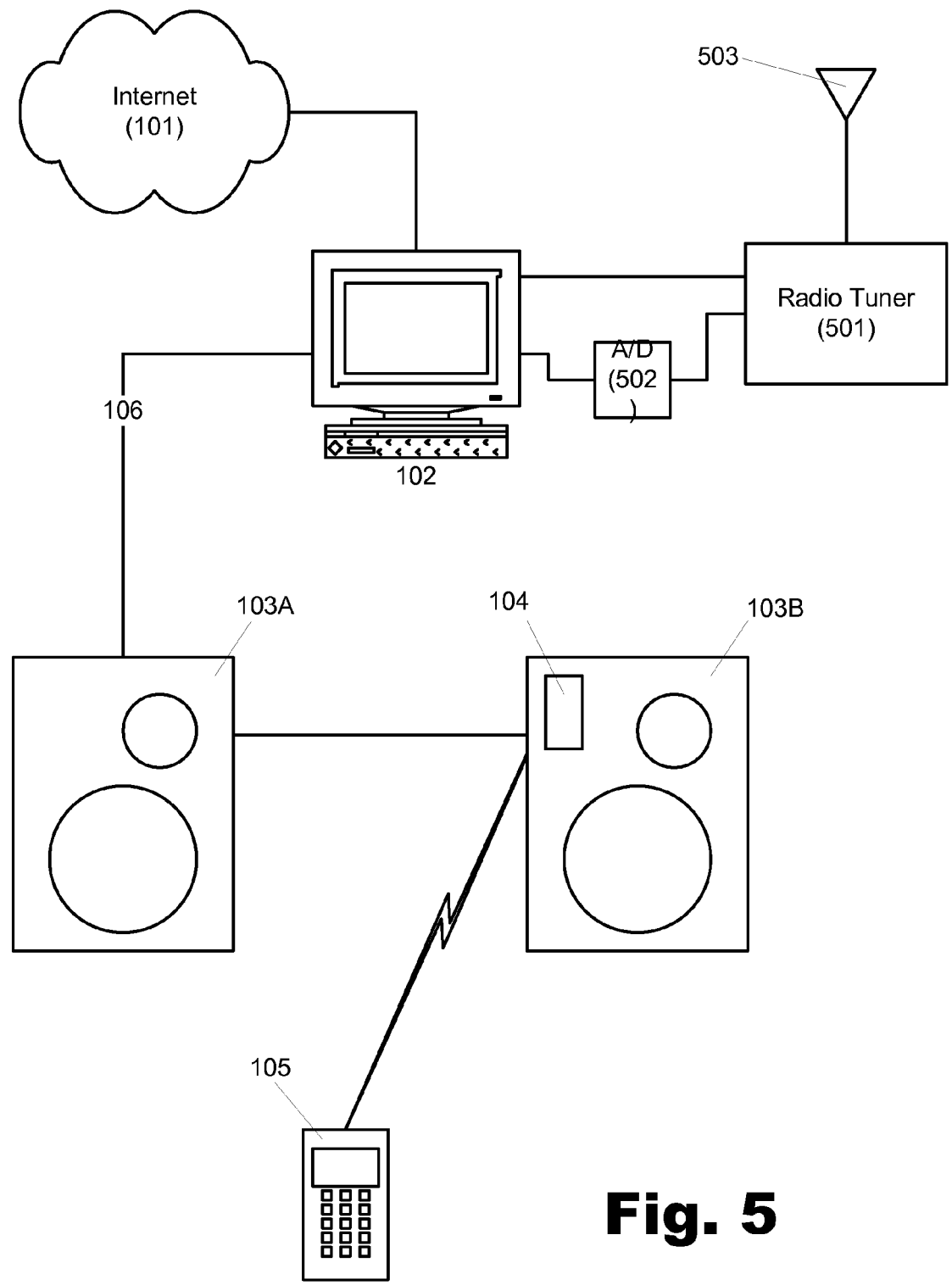
FIG. 5 is a diagram of a system for using streaming audio and audio files according to a third embodiment of the present invention.

FIG. 5 illustrates a third embodiment of the present invention. Again, identical elements are given identical reference numbers, and a redundant exposition will be omitted of those features common to multiple embodiments of the present invention.

As shown in FIG. 5, the computer (102) may also be connected to a radio tuner (501). This tuner (501) is preferably connected to a radio antenna (503) and receives, via the antenna (503), the full range of commercial and educational radio signals being broadcast on the AM (amplitude modulation) and FM (frequency modulation) bands.

The tuner (503) is controlled by the computer (102) to selectively tune a particular carrier frequency that carries the audio signal from a particular radio broadcasting station. At present, broadcast radio signals are typically analog signals. Consequently, the tuned audio signal is then provided by the tuner (503) to an analog-to-digital converter (502) and then output, in digital form, to the computer (102). If the radio signal is a digital signal, the converter (502) may not be necessary.

The computer (102) can output the audio signal received from the tuner (501) to the speakers (103) over the digital connection (106) (or the electrical wiring (202) of FIG. 4). Thus, the user listening to the speakers (103) can selectively access audio content from the Internet, audio files stored on the computer (102) and broadcast radio signals from the tuner (501).

The remote control unit (105) can be used to send a signal to the computer (102) specifying the carrier frequency to be tuned by the tuner (501). The computer (102) then controls the tuner (501) accordingly. In a preferred embodiment, the remote control unit will allow the user to scan through a listing of the spectrum of AM and FM radio frequencies and select a desired frequency (by frequency or radio call sign) in the same manner as selecting an audio file for a play-list as described above.

Figure 5A:
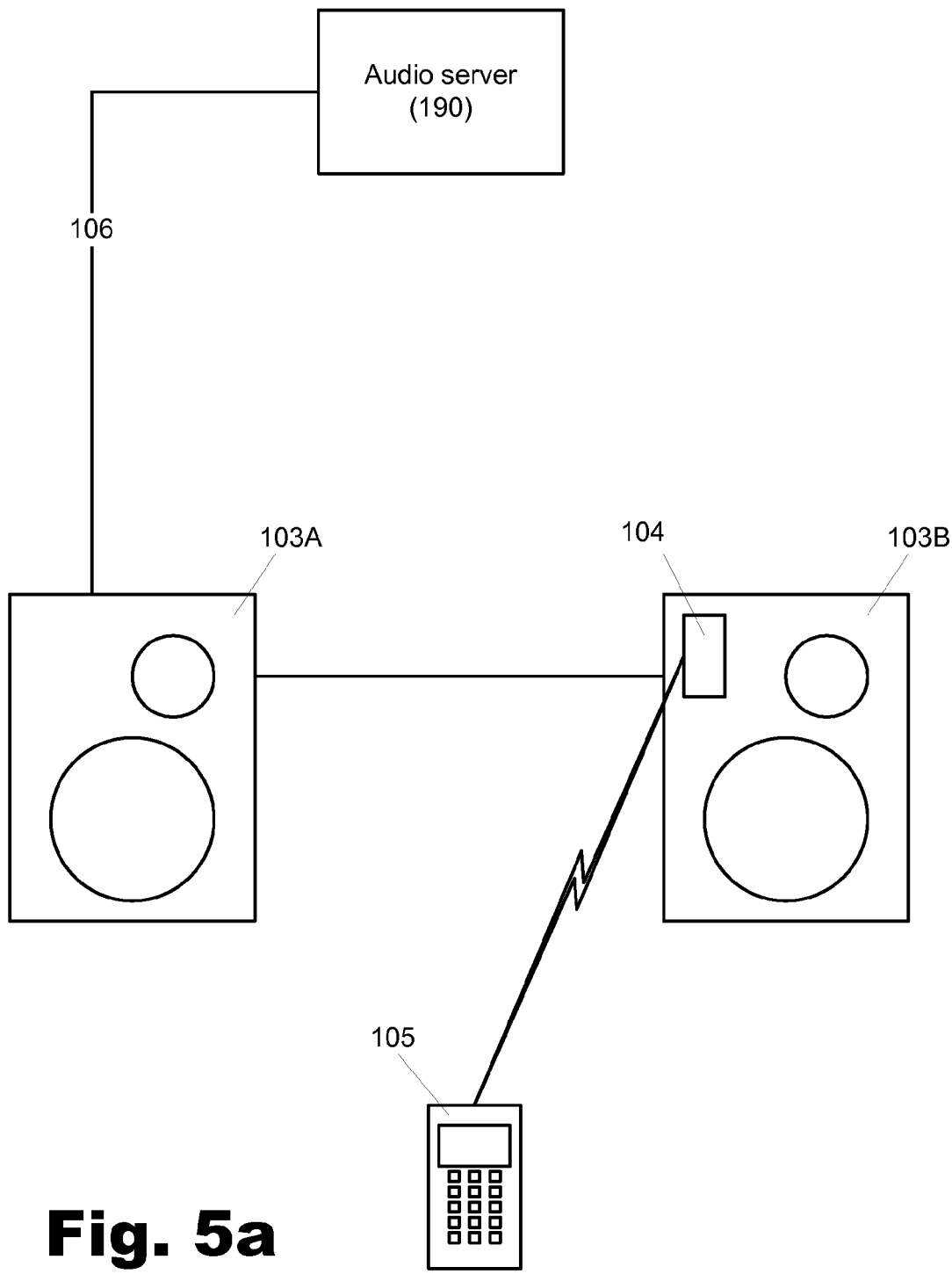
FIG. 5a is a diagram of a system for using streaming audio and audio files according to an alternative embodiment of the present invention.

FIG. 5a illustrates an alternate embodiment of the present invention. As shown in FIG. 1a, the digital audio source providing the audio signal to the speakers (103) need not be a computer or a computer with a radio tuner. The audio signal source (190) may be, for example, a CD player or a radio tuner (not connected to a computer) that outputs a digital audio signal to the speakers (103). In short, the audio signal source (190) can be any device that outputs a digital audio signal to the speakers (103). In some embodiments, the audio signal source may be controlled by the remote control unit (105) that communicates with the audio signal source over the connection (106) with the speakers (103). The term "audio server" (190) is used herein to indicate any audio signal source or combination of signal sources that are used to output an audio signal to the speakers (103). An audio server, according to the present invention, may be controlled by the remote control unit (105) over the connection (106) with the speakers (103). The term "audio programming" is used herein to refer generally to any recorded audio program or any streaming or broadcast audio program. Audio programming may be specified by the title of the program; by the station, URL or broadcaster providing the streaming or broadcast programming; or by some other designation.

Figure 6:
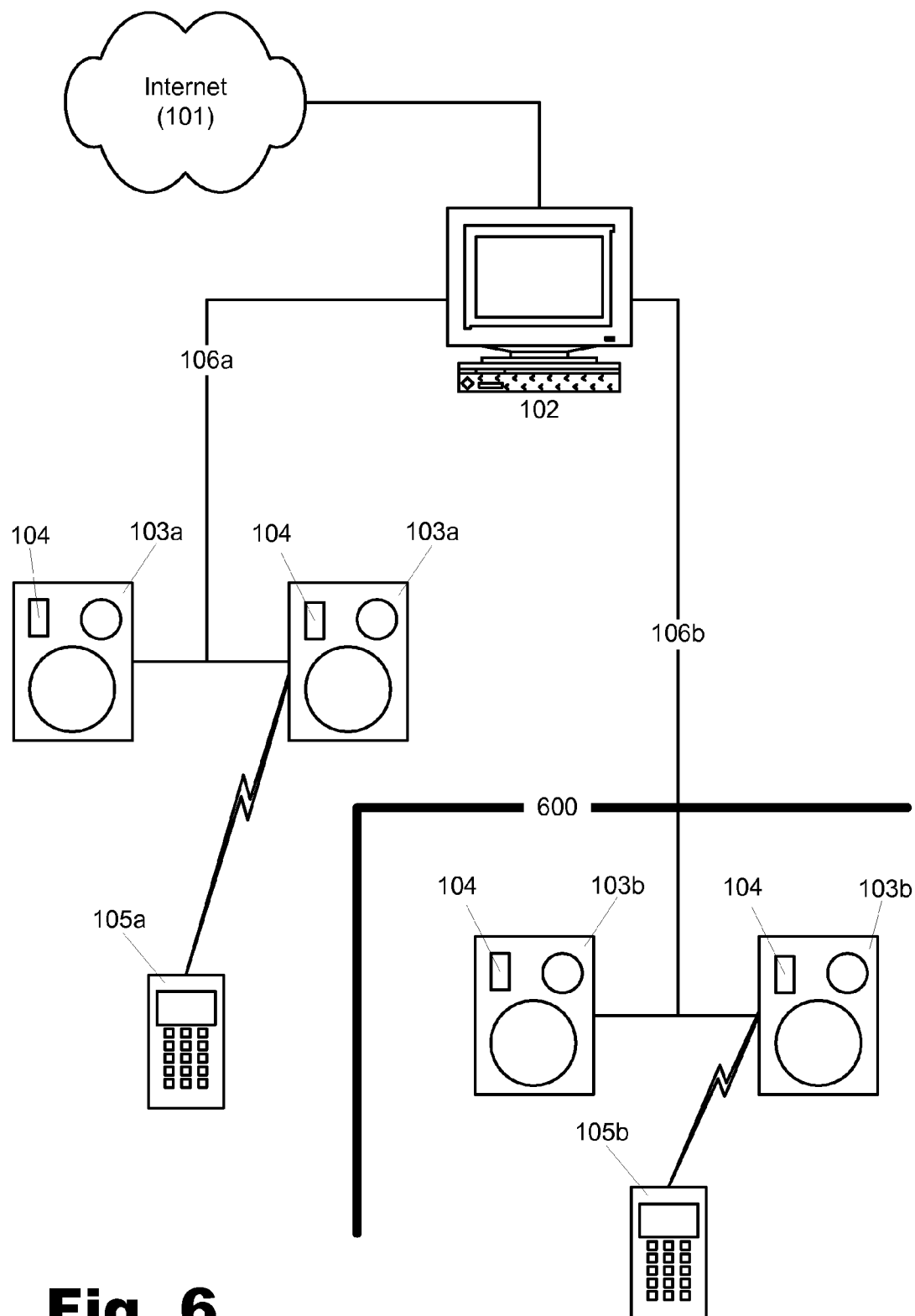
FIG. 6 is a diagram of a system for using streaming audio and audio files according to a fourth embodiment of the present invention.

FIG. 6 illustrates a fourth embodiment of the present invention. As described above, a computer (102) with certain types of digital connection (106) such as a USB, Ethernet or IEEE1394 connection, can output data fast enough to communicate with and service multiple devices. Consequently, it is possible for the same computer (102) to provide different audio programming to two separate speakers or sets of speakers (103) under the principles of the present invention.

As shown in FIG. 6, the computer (102) has a digital connection (106a) to a first set of speakers (103a) and a second digital connection (106b) to a second set of speakers (103b). The sets of speakers (103a, 103b) are in different rooms or otherwise separated from each other, as indicated by the wall or barrier (600).

Each set of speakers (103a, 103b) can be controlled by a separate and respective remote control unit (105a, 105b). Preferably, as before, the remote control units (105) communicate with the respective sets of speakers (103) using infrared signaling. Consequently, the sets of speakers (103a, 103b) must be separated such that the signals from either remote control unit (105a, 105b) cannot be inadvertently received by more than one set of speakers. Consequently, two separate users can access different audio programming from the computer (102) via the speakers (103a or 103b) located in the same room as that user.

As will be understood by those skilled in the art, the embodiment illustrated in FIG. 6 can be extended to provide more than two sets of speakers controlled by respective remote control units. The number of speaker sets that can provide individual audio programming to different users under the principles of the present invention is limited only by the processing speed of the computer (102) and the speed of the digital connections (106) between the computer (102) and respective sets of speakers (103).

Figure 7:
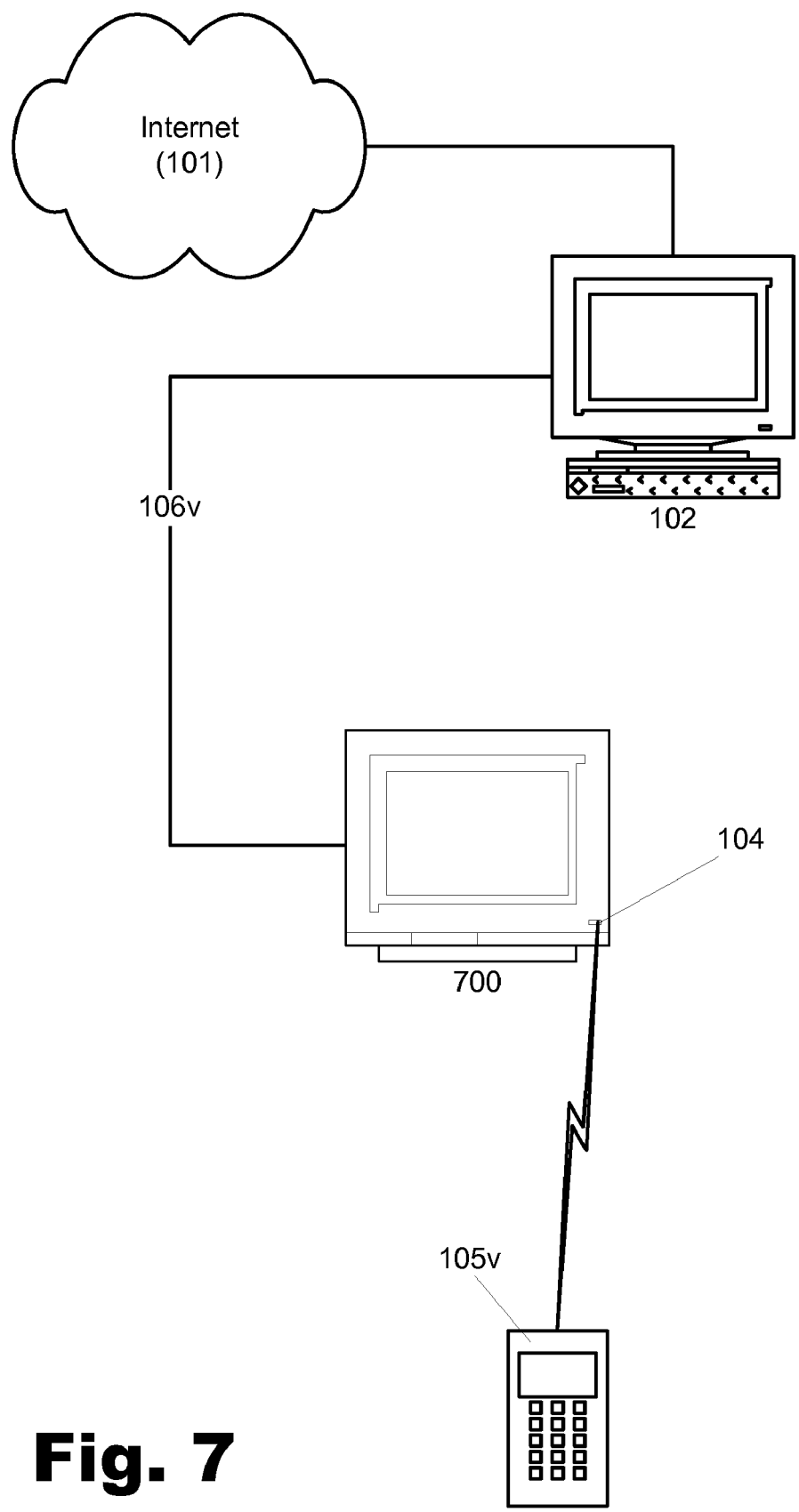
FIG. 7 is a diagram of a system for using streaming video and video files according to a fifth embodiment of the present invention.

FIG. 7 illustrates a fifth embodiment of the present invention. As shown in FIG. 7, and as mentioned above, the principles of the present invention can be applied to the accessing and use of audiovisual material as well as purely audio material. In FIG. 7, the computer (102) is again connected to the Internet (101) from whence the computer (102) downloads audiovisual programming in the form of discrete files or streaming video. Alternatively, video data might be supplied to the computer from a CD-ROM drive or a DVD drive in the computer. Video data might also be loaded to the computer from a floppy or zip disc. As used herein the term "video" or "video data" will be understood as synonymous with "audiovisual programming" or "audiovisual signal."

In any event, the video data acquired by the computer (102) can then be provided over a digital connection (106v) to a monitor or television set (700). As used herein, the term "monitor" will be used to refer collectively to video monitors, television sets and similar video output devices, whether using a cathode ray tube or a flat-screen technology.

The connection (106v) is preferably an IEEE 1394 connection, but may be, for example, an Ethernet connection or any other type of connection capable of carrying the digital audiovisual signal at the rates required for output to the monitor (700). The monitor (700) can be located away from the computer (102) in a place where it is more comfortable for the user to watch audiovisual programming, for example, near a sofa or bed.

A remote control unit (105v) communicates wirelessly with a wireless transceiver (104) in the monitor (700). As before, the remote control unit (105v) preferably communicates with the transceiver (104) using infrared signaling, but is not so restricted. The remote control unit (105v) will preferably be similar to the remote control unit (105) illustrated in FIG. 3. The remote control unit (105v) may have a display for displaying a list of available audiovisual programming received from the computer (102) over the connection (106v). The remote control unit (105v) will also preferably have a user input device with which the user can select an audiovisual program from the list and submit a command to the computer to provide that audiovisual programming to the television/monitor (700).

As before, the video signal from the computer (102) may or may not be compressed. If compressed, the monitor (700)

must be equipped with the corresponding decompression hardware so as to render the signal useable by the monitor (700).

Figure 7A:
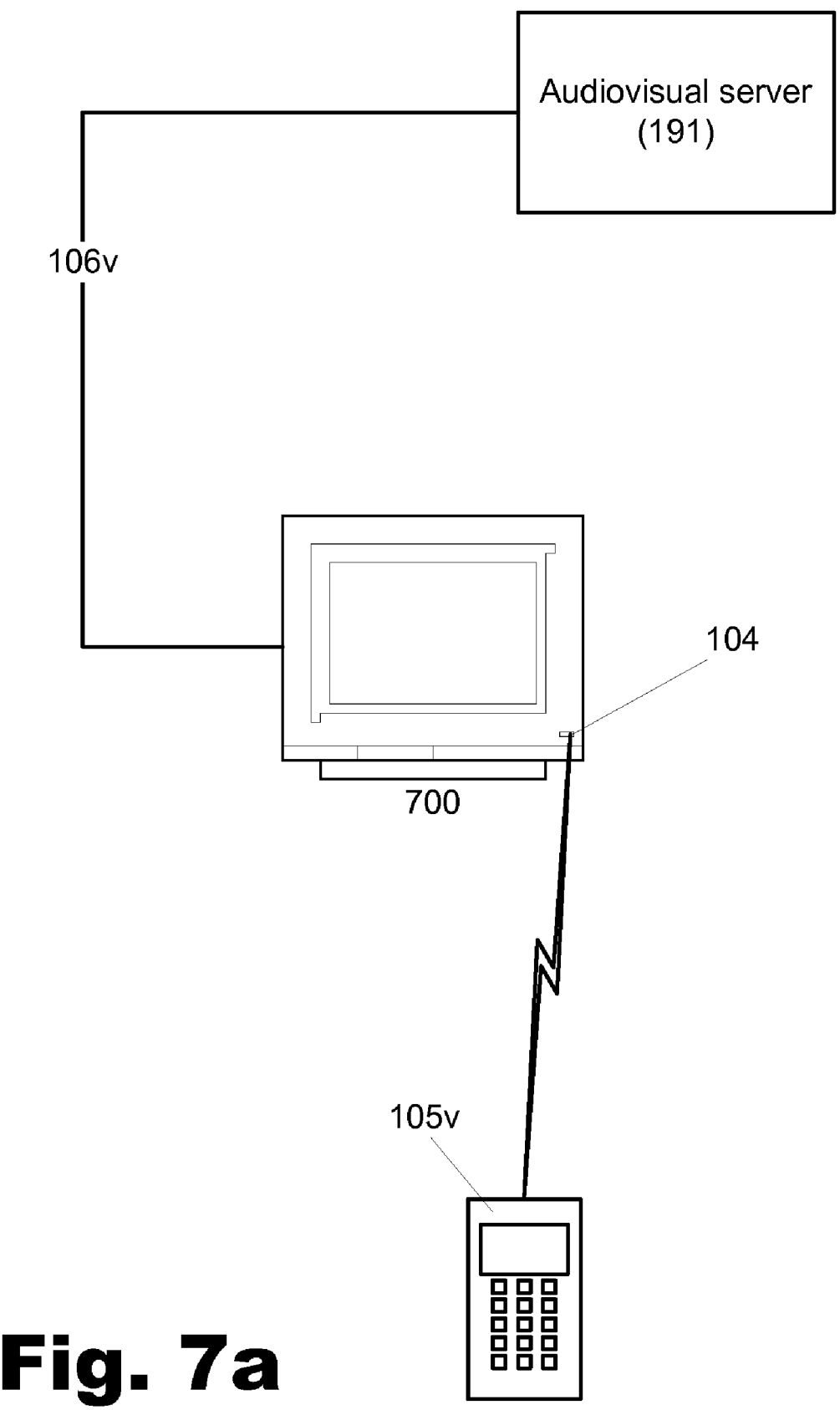
FIG. 7a is a diagram of an alternative system for using audiovisual signals according to a sixth embodiment of the present invention

FIG. 7a shows another embodiment of the present invention. As shown in FIG. 7a, the source of the audiovisual signal to the monitor (700) need not be a computer. Rather, any audiovisual signal source can output the audiovisual signal over the connection (106v) to the monitor (700).

In short, the audiovisual signal source (191) can be any device that outputs an audiovisual signal to the monitor (700) and is, preferably, controlled by the remote control unit (105) over the connection (106v). The term "audiovisual server" (191) is used herein to indicate any audiovisual signal source or combination of such signal sources that outputs an audiovisual signal to the monitor (700) and is, preferably, controlled by the remote control unit (105) over the connection (106v) with the monitor (700). An audiovisual server may be, but is not limited to, a video cassette recorder, cable or satellite television set-top box, digital video disc player, laser disc player and the like.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for managing audio and audiovisual programming comprising:
    a transceiver for making a digital connection between at least one speaker and an audio server over which said audio server provides an audio signal to said at least one speaker; and
    a remote control unit, wherein said remote control unit controls output of said audio signal from said audio server to said at least one speaker;
    wherein said transceiver communicates with said remote control unit, said remote control unit communicating with said transceiver and with said audio server over said same digital connection between said at least one speaker and said audio server.

2. The system of claim 1, wherein said digital connection comprises a wireless network.

3. The system of claim 1, wherein said audio server transmits a listing of available audio programming by title to said remote control unit, and said remote control unit displays said listing of titles on a display device of said remote control unit.

4. The system of claim 3, wherein said remote control unit comprises:
    a user input device with which said user can select an audio program from said listing and transmit a command for said audio server to output that selected audio programming to said at least one speaker.

5. The system of claim 4, wherein said remote control unit allows a user to create a play-list by selecting a sequence of audio programs from said listing.

6. The system of claim 3, wherein said listing of available audio programming comprises at least one on-line radio station.

7. The system of claim 3, wherein said listing of available audio programming comprises at least one streaming audio source.

8. The system of claim 3, wherein said listing of available audio programming comprises a play-list.

9. The system of claim 1, wherein said audio signal from said audio server is compressed and said at least one speaker further comprises decompression hardware for decompressing said signal.

10. The system of claim 1, further comprising:
    a number of speakers; and
    a number of remote control units,
    wherein said remote control units control said audio server such that a plurality of different audio signals are output by said audio server to respective speakers.

11. The system of claim 1, wherein said at least one speaker is incorporated in a video monitor and said audio server is incorporated in an audiovisual server that outputs an audiovisual signal to said monitor, said audiovisual signal including said audio signal for said at least one speaker.

12. The system of claim 11, wherein said audiovisual server transmits a listing by title of available audiovisual programming to said remote control unit.

13. The system of claim 12, wherein said remote control unit comprises:
    a display device for displaying said listing; and
    a user input device with which said user can select an audiovisual program from said list by title and transmit a command for said audiovisual server to output that selected audiovisual program to said monitor.

14. A method for managing audio and audiovisual programming comprising:
    making a digital connection between at least one speaker and an audio server over which said audio server provides an audio signal to said at least one speaker; and
    controlling, with a remote control unit, output of said audio signal from said audio server to said at least one speaker;
    wherein said transceiver communicates with said remote control unit, said remote control unit communicating with said transceiver and with said audio server over said same digital connection between said at least one speaker and said audio server.

15. The method of claim 14, wherein making said digital connection comprises transmitting said audio signal from said audio server to said speaker via a wireless network.

16. The method of claim 14, further comprising:
    transmitting a listing of available programming by title from said audio server to said remote control unit and displaying said listing by title on a display device of said remote control unit;
    wherein said same digital connection carries all of said audio signal, user input from said remote control unit and said listing of available programming.

17. The method of claim 16, further comprising:
    receiving a selection of an audio program from said list with a user input device of said remote control unit; and
    transmitting a command for said audio server to output that selected audio program to said at least one speaker.

18. The method of claim 16, wherein said listing of available programming comprises at least one on-line radio station.

19. The method of claim 16, wherein said listing of available programming comprises at least one streaming audio source.

20. The method of claim 16, wherein said listing of available programming comprises a play-list.

21. The method of claim 20, further comprising allowing a user to create a play-list by selecting a sequence of audio programs from said listing.

22. The method of claim 14, further comprising:
- outputting a plurality of different audio signals to a plurality of speakers; and
- controlling said plurality of different audio signals with a plurality of remote control units and transceivers located with at least some of said speakers; wherein said different audio signals are addressed to corresponding said speakers based on which of said plurality of remote control units requested one said audio signals through which of said speakers.

23. The method of claim 14, wherein said at least one speaker is incorporated in a video monitor and said audio server is incorporated in an audiovisual server, said outputting an audio signal comprising outputting an audiovisual signal including said audio signal for said at least one speaker.

* * * * *